United States Patent
Aikawa et al.

(10) Patent No.: US 11,380,920 B2
(45) Date of Patent: Jul. 5, 2022

(54) COGENERATION SYSTEM FOR CONTROLLING FUEL CELL DEVICES BASED ON OPERATION MODE

(71) Applicant: KYOCERA Corporation, Kyoto (JP)

(72) Inventors: Shinji Aikawa, Yokohama (JP); Tsudoi Utamaru, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 124 days.

(21) Appl. No.: 16/313,855

(22) PCT Filed: Jun. 28, 2017

(86) PCT No.: PCT/JP2017/023827
§ 371 (c)(1),
(2) Date: Dec. 27, 2018

(87) PCT Pub. No.: WO2018/003890
PCT Pub. Date: Jan. 4, 2018

(65) Prior Publication Data
US 2019/0148745 A1 May 16, 2019

(30) Foreign Application Priority Data
Jun. 28, 2016 (JP) .............................. JP2016-128200

(51) Int. Cl.
*H01M 8/04828* (2016.01)
*F24H 1/10* (2022.01)
(Continued)

(52) U.S. Cl.
CPC ............ *H01M 8/0494* (2013.01); *F24H 1/00* (2013.01); *F24H 1/10* (2013.01); *H01M 8/00* (2013.01); *H01M 8/04* (2013.01); *H01M 8/04858* (2013.01); *H01M 8/12* (2013.01); *F24H 2240/10* (2013.01); *H01M 8/10* (2013.01);
(Continued)

(58) Field of Classification Search
CPC ........... H01M 8/0432; H01M 8/04619; H01M 8/0494; H01M 8/04955; H01M 8/249; Y02E 60/50
See application file for complete search history.

(56) References Cited

U.S. PATENT DOCUMENTS

2002/0037443 A1   3/2002 Christen et al.
2004/0038092 A1*  2/2004 Scholta ............ H01M 8/04701
                                                                429/411
(Continued)

FOREIGN PATENT DOCUMENTS

JP   H8-236134 A    9/1996
JP   2004-178877 A  6/2004
(Continued)

*Primary Examiner* — Imran Akram
(74) *Attorney, Agent, or Firm* — Hauptman Ham, LLP

(57) ABSTRACT

Provided is a cogeneration system that includes a plurality of fuel cell devices capable of supplying heat and power to a heat load and a power load and a control device connected to the fuel cell devices. The control device determines an operation mode on the basis of at least one of a heat demand value and a power demand value. The control device controls a power generation efficiency and a heat recovery efficiency by controlling the fuel cell devices on the basis of the operation mode determined.

9 Claims, 18 Drawing Sheets

(51) Int. Cl.
  *H01M 8/12* (2016.01)
  *H01M 8/04858* (2016.01)
  *H01M 8/04* (2016.01)
  *F24H 1/00* (2022.01)
  *H01M 8/00* (2016.01)
  *H01M 8/10* (2016.01)

(52) U.S. Cl.
  CPC .......... *H01M 2008/1293* (2013.01); *H01M 2250/10* (2013.01); *H01M 2250/405* (2013.01)

(56) References Cited

U.S. PATENT DOCUMENTS

| | | | |
|---|---|---|---|
| 2005/0048335 A1* | 3/2005 | Fields | H01M 8/0488 429/432 |
| 2005/0255354 A1* | 11/2005 | Yamasaki | H01M 8/04932 429/425 |
| 2006/0110639 A1* | 5/2006 | Walter | H01M 8/04388 429/432 |
| 2007/0092782 A1* | 4/2007 | Fuss | H01M 8/0273 429/514 |
| 2007/0269692 A1* | 11/2007 | Chen | H01M 16/003 429/432 |
| 2007/0269696 A1* | 11/2007 | Skok | H01M 8/04111 429/464 |
| 2012/0028153 A1* | 2/2012 | Shigezumi | H01M 8/04679 429/432 |
| 2012/0070755 A1* | 3/2012 | Kaku | H01M 8/0494 429/429 |
| 2013/0171533 A1* | 7/2013 | Astrom | H01M 8/04395 429/423 |
| 2015/0021992 A1* | 1/2015 | Toya | H01M 8/0494 307/25 |
| 2016/0134124 A1* | 5/2016 | Kaag | H01M 16/006 307/20 |

FOREIGN PATENT DOCUMENTS

| | | |
|---|---|---|
| JP | 2004327160 A | 11/2004 |
| JP | 2004-342440 A | 12/2004 |
| JP | 2006-71216 A | 3/2006 |
| JP | 2009277525 A | 11/2009 |
| JP | 2013-16354 A | 1/2013 |
| JP | 2014-214635 A | 11/2014 |

* cited by examiner

FIG. 5

| Power load factor % | Power load kW | No. of devices for each output kW | | | | | Gas consumption amount kW | Total power generation amount kW | Total heat recovery amount kW | Power generation efficiency % | Heat recovery efficiency % |
|---|---|---|---|---|---|---|---|---|---|---|---|
| | | 3 | 2.25 | 1.5 | 0.75 | 0 | | | | | |
| 100 | 30 | 10 | 0 | 0 | 0 | 0 | 56.71 | 30.75 | 25.89 | 54.2 | 45.7 |
| 75 | 22.5 | 0 | 10 | 0 | 0 | 0 | 44.02 | 22.87 | 20.12 | 52.0 | 45.7 |
| | | 7 | 0 | 1 | 0 | 2 | 46.48 | 22.86 | 22.48 | 49.2 | 48.4 |
| 50 | 15 | 0 | 0 | 10 | 0 | 0 | 31.32 | 15.00 | 14.36 | 47.9 | 45.8 |
| | | 5 | 0 | 0 | 0 | 5 | 37.50 | 14.97 | 20.25 | 39.9 | 54.0 |
| 25 | 7.5 | 0 | 0 | 0 | 10 | 0 | 22.70 | 7.56 | 11.99 | 33.3 | 52.8 |
| | | 2 | 0 | 1 | 0 | 7 | 27.27 | 7.08 | 16.84 | 26.0 | 61.7 |
| 0 | 0 | 0 | 0 | 0 | 0 | 10 | 18.29 | -0.81 | 14.61 | -4.5 | 79.9 |

FIG. 6A

| Time | 8 | 9 | 10 | 11 | 12 | 13 | 14 | 15 | 16 | 17 | 18 |
|---|---|---|---|---|---|---|---|---|---|---|---|
| Demand kW | 3 | 6 | 6 | 6 | 6 | 9 | 9 | 9 | 6 | 6 | 6 |

FIG. 6B

| Time | 8 | 9 | 10 | 11 | 12 | 13 | 14 | 15 | 16 | 17 | 18 | L |
|---|---|---|---|---|---|---|---|---|---|---|---|---|
| Power generation amount of first fuel cell device kW | 1 | 2 | 3 | 3 | 3 | 3 | 3 | 3 | 3 | 3 | 2 | 29 |
| Power generation amount of second fuel cell device kW | 1 | 2 | 3 | 3 | 3 | 3 | 3 | 3 | 0 | 0 | 2 | 23 |
| Power generation amount of third fuel cell device kW | 1 | 2 | 0 | 0 | 0 | 3 | 3 | 3 | 3 | 3 | 2 | 20 |

FIG. 6C

| Time | 8 | 9 | 10 | 11 | 12 | 13 | 14 | 15 | 16 | 17 | 18 | L | Cumulative total of L |
|---|---|---|---|---|---|---|---|---|---|---|---|---|---|
| Power generation amount of first fuel cell device kW | 1 | 2 | 0 | 0 | 0 | 3 | 3 | 3 | 3 | 3 | 2 | 20 | 49 |
| Power generation amount of second fuel cell device kW | 1 | 2 | 3 | 3 | 3 | 3 | 3 | 3 | 0 | 3 | 2 | 26 | 49 |
| Power generation amount of third fuel cell device kW | 1 | 2 | 3 | 3 | 3 | 3 | 3 | 3 | 3 | 0 | 2 | 26 | 46 |

FIG. 7A

| Time | 18 | 19 | 20 | 21 | 22 | 23 | 0 | 1 | 2 | 3 | 4 | 5 | 6 | 7 | 8 |
|---|---|---|---|---|---|---|---|---|---|---|---|---|---|---|---|
| Demand kW | 6 | 6 | 6 | 3 | 3 | 3 | 3 | 2 | 2 | 2 | 2 | 2 | 2 | 3 | 3 |

FIG. 7B

| Time | 19 | 20 | 21 | 22 | 23 | 0 | 1 | 2 | 3 | 4 | 5 | 6 | 7 | 8 | L | Cumulative total of L |
|---|---|---|---|---|---|---|---|---|---|---|---|---|---|---|---|---|
| Power generation amount of first fuel cell device kW | 2 | 2 | 1 | 1 | 1 | 1 | 1 | 1 | 1 | 1 | 1 | 1 | 1 | 1 | 16 | 65 |
| Power generation amount of second fuel cell device kW | 2 | 2 | 1 | 1 | 1 | 1 | – | – | – | – | – | – | 1 | 1 | 10+20 | 79 |
| Power generation amount of third fuel cell device kW | 2 | 2 | 1 | 1 | 1 | 1 | 1 | 1 | 1 | 1 | 1 | 1 | 1 | 1 | 16 | 62 |

Stop    Start

FIG. 9

| | Power load factor: 0% | Power load factor: 25% | Power load factor: 50% | Power load factor: 75% | Power load factor: 100% | Total heat recovery amount [kW] |
|---|---|---|---|---|---|---|
| | 0 | 0 | 10 | 0 | 0 | 14.4kW |
| | 5 | 0 | 0 | 0 | 5 | 20.3kW |
| Candidate A | 1 | 3 | 2 | 3 | 1 | 16.6kW |
| | ... | ... | ... | ... | ... | |
| Candidate B | 2 | 3 | 0 | 3 | 2 | 16.6kW |
| | 1 | 3 | 3 | 1 | 2 | 17.7kW |

Determine as candidate

FIG. 10

| Fuel cell device | Cumulative power generation amount [kWh] | Priority | Power load factor [%] |
|---|---|---|---|
| First fuel cell device | 30,600 | 1 | 0 |
| Second fuel cell device | 30,500 | 2 | 0 |
| Third fuel cell device | 25,700 | 3 | 25 |
| Fourth fuel cell device | 24,700 | 4 | 25 |
| Fifth fuel cell device | 24,300 | 5 | 25 |
| Sixth fuel cell device | 21,200 | 6 | 75 |
| Seventh fuel cell device | 20,200 | 7 | 75 |
| Eighth fuel cell device | 20,000 | 8 | 75 |
| Ninth fuel cell device | 19,400 | 9 | 100 |
| Tenth fuel cell device | 18,200 | 10 | 100 |

FIG. 11

|  | Power load factor:0% | Power load factor:25% | Power load factor:50% | Power load factor:75% | Power load factor:100% |
|---|---|---|---|---|---|
| Pattern A | 1 | 0 | 1 | 0 | 1 |
| Pattern B | 0 | 2 | 0 | 0 | 1 |

FIG. 12A

| Fuel cell device | Cumulative power generation amount | Weighting coefficient | Power load factor (Power load) | Value obtained by multiplying weighting coefficient by power load |
|---|---|---|---|---|
| First fuel cell device | 1,000kWh | 1 | 100%(3kWh) | 3 |
| Second fuel cell device | 1,500kWh | 1.5 | 50%(1.5kWh) | 2.25 |
| Third fuel cell device | 2,000kWh | 2 | 0%(0kWh) | 0 |
| | | | Total | 5.25 |

FIG. 12B

| Fuel cell device | Cumulative power generation amount | Weighting coefficient | Power load factor (Power load) | Value obtained by multiplying weighting coefficient by power load |
|---|---|---|---|---|
| First fuel cell device | 1,000kWh | 1 | 0%(0kWh) | 0 |
| Second fuel cell device | 1,500kWh | 1.5 | 50%(1.5kWh) | 2.25 |
| Third fuel cell device | 2,000kWh | 2 | 100%(3kWh) | 6 |
| | | | Total | 8.25 |

FIG. 13

| Priority | Name of device | Power consumption | Difference from maximum power generation target value (25 kW) | Heat consumption | Difference from maximum heat recovery target value (25 kW) |
|---|---|---|---|---|---|
| 1 | Air conditioner and water cooler/heater for air conditioner | 7kW 3kW | 0kW | 5.6kW | 2.8kW |
| 2 | Ventilation fan | 5kW | 5kW | 0kW | 8.3kW |
| 3 | Water cooler/heater for bath | 2kW | 8kW | 8.3kW | 0kW |
| 4 | Hot-water heater | 1kW | 9kW | 11.1kW | −2.8kW |
| 5 | Dishwasher | 20kW | −5kW | 8.3kW | 0kW |
| ... | | | | | |

FIG. 14

| | Power load factor : 0% | Power load factor : 25% | Power load factor : 50% | Power load factor : 75% | Power load factor : 100% | Total heat recovery amount [kW] |
|---|---|---|---|---|---|---|
| | 0 | 0 | 0 | 10 | 0 | 20.1 |
| Candidate C | 2 | 0 | 1 | 0 | 7 | 22.2 |
| | 1 | 1 | 0 | 3 | 5 | 21.3 |
| | ... | | | | | |
| Candidate D | 2 | 0 | 0 | 2 | 6 | 22.2 |
| | 1 | 0 | 0 | 6 | 3 | 21.3 |

Determine as candidate

FIG. 15

| Fuel cell device | Cumulative power generation amount [kWh] | Priority | Power load factor [%] |
|---|---|---|---|
| First fuel cell device | 50,600 | 1 | 0 |
| Second fuel cell device | 50,500 | 2 | 0 |
| Third fuel cell device | 37,700 | 3 | 75 |
| Fourth fuel cell device | 36,700 | 4 | 75 |
| Fifth fuel cell device | 21,200 | 5 | 100 |
| Sixth fuel cell device | 21,200 | 5 | 100 |
| Seventh fuel cell device | 21,200 | 5 | 100 |
| Eighth fuel cell device | 21,200 | 5 | 100 |
| Ninth fuel cell device | 21,200 | 5 | 100 |
| Tenth fuel cell device | 21,200 | 5 | 100 |

COGENERATION SYSTEM FOR CONTROLLING FUEL CELL DEVICES BASED ON OPERATION MODE

CROSS-REFERENCE TO RELATED APPLICATION

This application is a national phase of International Application Number PCT/JP2017/023827, filed Jun. 28, 2017, which claims priority to and the benefit of Japanese Patent Application No. 2016-128200 filed on Jun. 28, 2016, the entire contents of which are incorporated herein by reference.

TECHNICAL FIELD

This disclosure relates to a cogeneration system, a control device and a control method.

BACKGROUND

A cogeneration system has been disclosed. The cogeneration system increases the drive amount of one fuel cell by driving a surplus power heater to increase the demanded power amount, and compensates for a lack of heat by the heat exhausted from the fuel cell. However, there are some cases where, when one fuel cell is controlled by the rated operation or the power load following operation, the power generation efficiency or the heat recovery efficiency that fits the user needs cannot be realized.

SUMMARY

A cogeneration system according to an embodiment of this disclosure includes: a plurality of fuel cell devices capable of supplying heat and power to a heat load and a power load; and a control device connected to the fuel cell devices. The control device determines the operation mode on the basis of at least one of a heat demand value and a power demand value and controls the fuel cell devices on the basis of the determined operation mode to control the power generation efficiency and the heat recovery efficiency.

A control device according to an embodiment of this disclosure determines the operation mode of a plurality of fuel cell devices capable of supplying heat and power to a heat load and a power load on the basis of at least one of a heat demand value and a power demand value. The control device also controls the fuel cell devices on the basis of the determined operation mode to control the power generation efficiency and the heat recovery efficiency.

In a control method according to an embodiment of this disclosure, a step of determining the operation mode of a plurality of fuel cell devices capable of supplying heat and power to a heat load and a power load on the basis of at least one of a heat demand value and a power demand value is performed. In the control method, a step of controlling the power generation efficiency and the heat recovery efficiency by controlling the fuel cell devices on the bases of the determined operation mode is also performed.

BRIEF DESCRIPTION OF THE DRAWINGS

In the accompanying drawings:

FIG. 5 is a diagram illustrating numbers corresponding to FIGS. 4A and 4B;

FIG. 6A is a first diagram illustrating a power demand pattern;

FIG. 6B is a diagram illustrating operation results;

FIG. 6C is a first diagram illustrating candidates of operation schedule;

FIG. 7A is a second diagram illustrating a power demand pattern;

FIG. 7B is a second diagram illustrating candidates of operation schedule;

FIG. 9 is a diagram illustrating the number or the like of fuel cell devices with respect to each power load factor;

FIG. 10 is a diagram illustrating cumulative power generation amount or the like with respect to each fuel cell device;

FIG. 11 is a diagram illustrating the number or the like with respect to each pattern and each power load factor;

FIG. 12A is a first diagram illustrating the cumulative power generation amount or the like with respect to each fuel cell device;

FIG. 12B is a second diagram illustrating the cumulative power generation amount or the like with respect to each fuel cell device;

FIG. 13 is a diagram illustrating the priority or the like of general devices;

FIG. 14 is a diagram illustrating the number or the like of fuel cell devices with respect to each power load factor;

FIG. 15 is a diagram illustrating the cumulative power generation amount or the like with respect to each fuel cell device;

DETAILED DESCRIPTION

Figure 1:
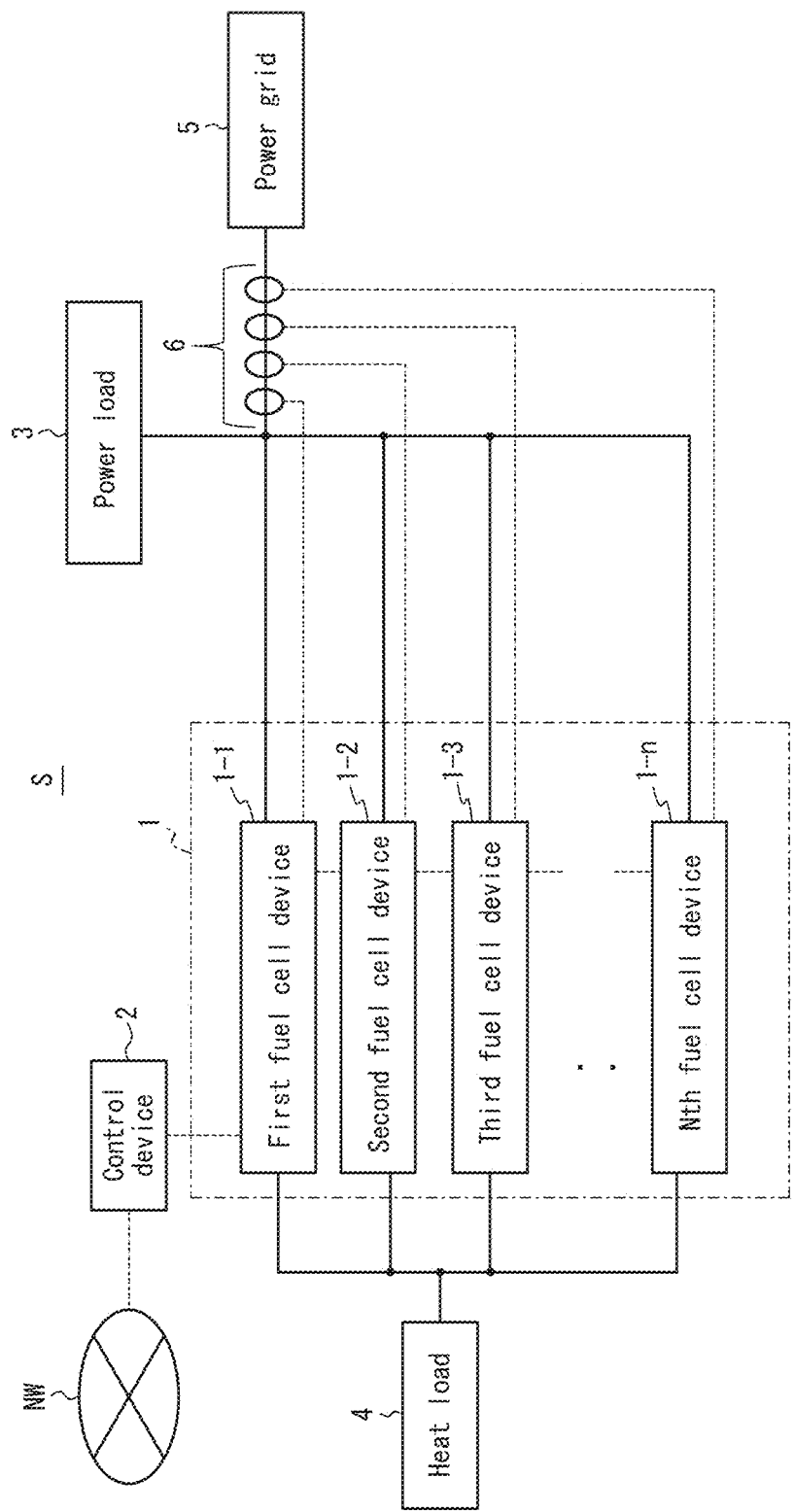
FIG. 1 is a functional block diagram of a cogeneration system according to an embodiment of this disclosure.

As illustrated in FIG. 1, a cogeneration system S is provided in consumer facilities such as general residences or non-residences (office buildings, warehouses, retailers, restaurants or the like). The cogeneration system S includes at least a plurality of fuel cell devices 1 and a control device 2. The cogeneration system S may further include a power load 3, a heat load 4, a power grid 5, a current sensor 6 and network NW. The control device 2 may be connected to the network NW. Hereinafter the power grid 5 is referred to as a grid. In FIG. 1, power lines and heat exhaust lines are indicated by solid lines. Control lines or information transmission lines are indicated by dashed lines. Among solid lines, the line connecting between the fuel cell device 1 and the heat load 4 indicates a heat exhaust line.

The fuel cell device 1 includes a first fuel cell device 1-1, a second fuel cell device 1-2, a third fuel cell device 1-3 . . . and a nth fuel cell device 1-$n$ (n: arbitrary natural number). The number of the fuel cell devices 1 is two or more arbitrary natural numbers. The fuel cell devices 1 are connected each other via a control line or an information transmission line. Thus the fuel cell devices 1 can mutually transmit/receive the information that is received by the first fuel cell device 1-1 from the control device 2.

Each of the fuel cell devices 1 is, for example, a polymer electrolyte fuel cell (PEFC), a solid oxide fuel cell (SOFC) or the like. The fuel cell device 1 is electrically connected to the grid 5 and can supply power and heat to the power load 3 and the heat load 4 in corporation with the grid 5. Each of the fuel cell devices 1 may include a fuel cell that includes a cell stack and generates DC power and a power conditioning system (PCS) configured to convert DC power to AC power. Each of the fuel cell devices 1 may further include a controller consisting of a processor such as a central processing unit (CPU) or the like. Each of the fuel cell devices 1 receives power supply from the grid 5 and starts operation. Each of the fuel cell devices 1 can perform self-sustained operation without receiving power supply from the grid 5 after start-up.

Figure 2:
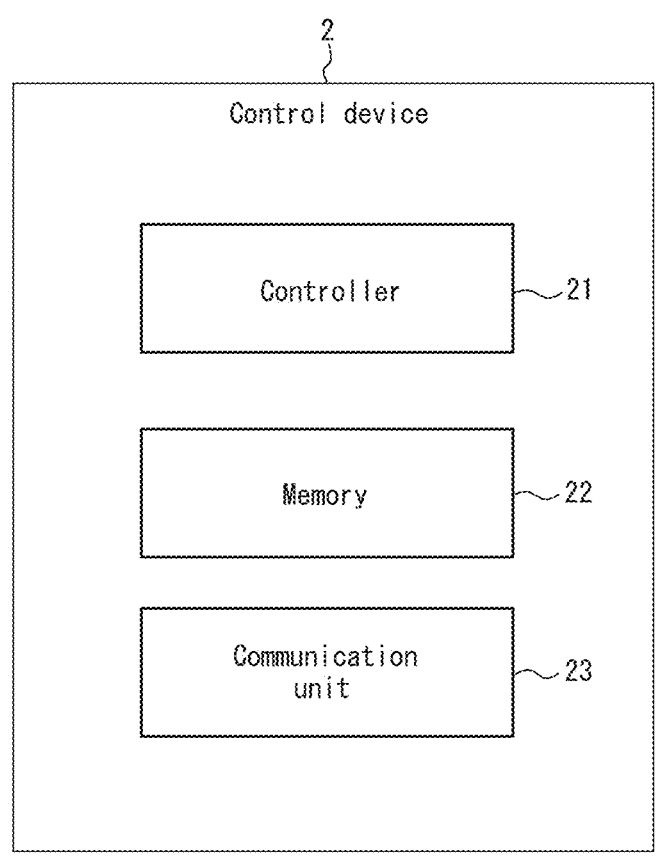
FIG. 2 is a functional block diagram of a control device in FIG. 1.

The control device 2 is an energy management system (EMS), for example. As illustrated in FIG. 2, the control device 2 includes a controller 21, a memory 22 and a communication unit 23.

The controller 21 controls each function of the control device 2. The controller 21 consists of a processor such as a CPU configured to execute a program that defines control procedures. The program is stored in the memory 22 or an external memory medium such as a nonvolatile memory or the like. The controller 21 acquires at least one of the heat demand value and the power demand value.

The controller 21 determines (calculates) the power demand value of the power load 3 and the heat demand value of the heat load 4. For example, the controller 21 estimates and determines the power demand value and the heat demand value on the basis of at least one of the weather, the gas rate, the power selling or purchasing rate, the break-even point of the consumer facility, the day of the week, the degradation degree of the fuel cell device 1, the time of day, the power consumption and the gas consumption. The controller 21 stores the power demand value and the heat demand value in the memory 22. As an alternative example, the controller 21 may determine the power demand value and the heat demand value on the basis of the heat recovery target value and the power generation target value.

The degradation degree of the fuel cell device 1 can be determined by measuring the resistance value (AC impedance) of the cell stack of the fuel cell device 1 by the Cole-Cole plot measurement method. The resistance value increases as the operating hours of the fuel cell device 1 increases. Voltage of the fuel cell decreases as the fuel cell device degrades, and the power generation amount and the power generation efficiency decrease. Therefore, according to the law of conservation of energy, the heat recovery amount from the fuel cell device 1 increases.

The controller 21 determines the operation mode of the fuel cell device 1 on the basis of at least one of the heat demand value and the power demand value. The controller 21 controls the fuel cell devices 1 on the basis of the determined operation mode to control the power generation efficiency and the heat recovery efficiency. The operation modes include, for example, a power generation efficiency priority mode, a heat recovery priority mode, a demand response (DR) mode, an emergency mode, an economy mode, a life unification mode, an environmental priority mode (a carbon dioxide (CO2) emission priority mode), a balance mode and a power selling mode or the like. The controller 21 may control the fuel cell devices 1 by using only one of these operation modes or by combining some of the operation modes. The mode names are provided for the purpose of illustration.

The memory 22 consists of a semiconductor memory, a magnetic memory or the like may, for example. The memory 22 stores a variety of information or programs for operating the control device 2 and also serves as a work memory. The memory 22 may store a variety of arithmetic operation algorism executed by the controller 21 and reference tables such as look-up tables or the like. The memory 22 can store any information used by this embodiment.

The communication unit 23 is an interface that transmits/receives the control information to/from the fuel cell devices 1. The communication unit 23 may have a communication function by wire or wireless or a combination thereof. The communication functions by wire may be a universal serial bus (USB), a local area network (LAN) or the like. The communication functions by wireless may be a long term evolution (LTE), a wireless LAN, an infrared communication or the like. With these communication functions installed, the control device 2 can be operated or controlled by an external operation terminal over the network NW, for example. Further, the control device 2 can transmit a variety of information to an external device.

Referring back to FIG. 1, the power load 3 is, for example, a home appliance that receives power supply from the fuel cell devices 1. The power load 3 is, for example, a laundry machine, a dryer, a vacuum, a fluorescent, or the like. Although FIG. 1 illustrates only one power load 3, two or more power loads 3 may be provided.

The heat load 4 is, for example, a hot water tank, a floor heater, an air conditioner or the like that receives heat supply from the fuel cell devices 1. Although FIG. 1 illustrates only one heat load 4, two or more heat loads 4 may be provided.

The current sensor 6 is a current transformer (CT), for example. However, any element that can detect the current value and the current direction can be employed as the current sensor 6. The current sensor 6 can detect if the AC power output by the fuel cell devices 1 reverses to the grid 5. The current sensor 6 is disposed at a position at which it detects, out of AC power output from the fuel cell devices 1, the current flowing to the grid 5 after being supplied to the power load 3.

[Power Generation Efficiency Priority Mode and Heat Recovery Priority Mode]

FIGS. 3 and 4 are diagrams illustrating a relationship between the power load factor and each index when each of the fuel cell devices 1 is operated alone. According to this embodiment, total of the maximum rated output power of each of the fuel cell devices 1 is defined as 100%. For example, when three fuel cell devices 1, each having the maximum rated output power of 3 [kW], are operated, total maximum rated output power is 9 [kW]. Therefore, when three fuel cell devices 1 are operated and the output power is 9 [kW], the power load factor is 100%. Further, when three fuel cell devices 1 are operated and the output power is 4.5 [kW], the power load factor is 50%. As another example, when ten fuel cell devices 1 are operated and output power is 30 [kW], the power load factor is 100%. Furthermore, when ten fuel cell devices 1 are operated and the output power is 15 [kW], the power load factor is 50%.

Figure 3A:
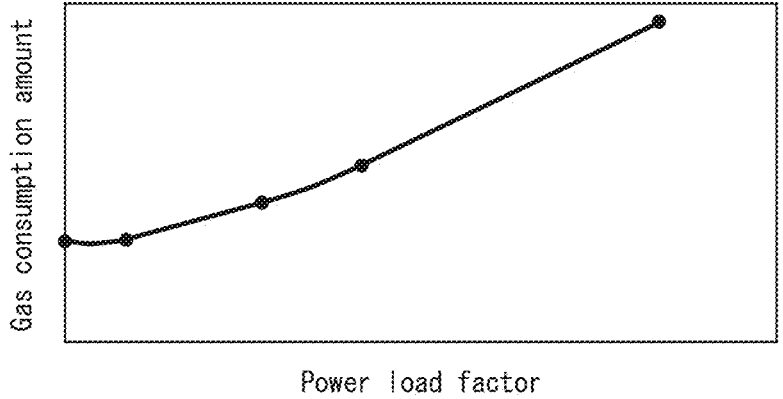
FIG. 3A is a diagram illustrating a relationship between the power load factor and the gas consumption.
Figure 3B:
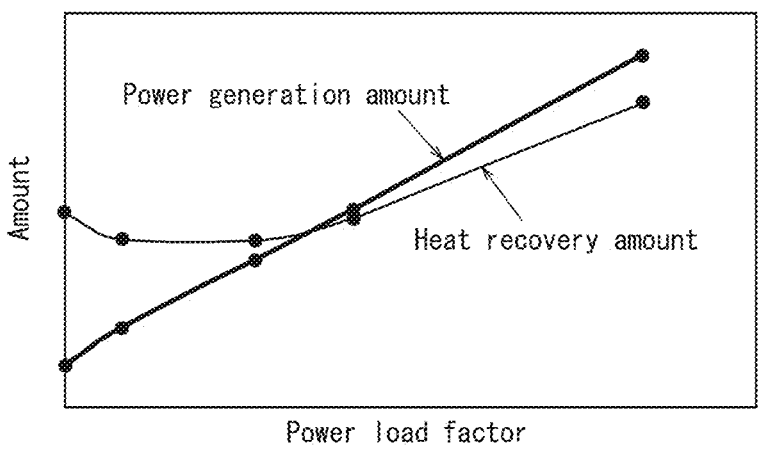
FIG. 3B is a diagram illustrating a relationship between the power load factor and the power generation amount or the heat recovery amount.
Figure 3C:
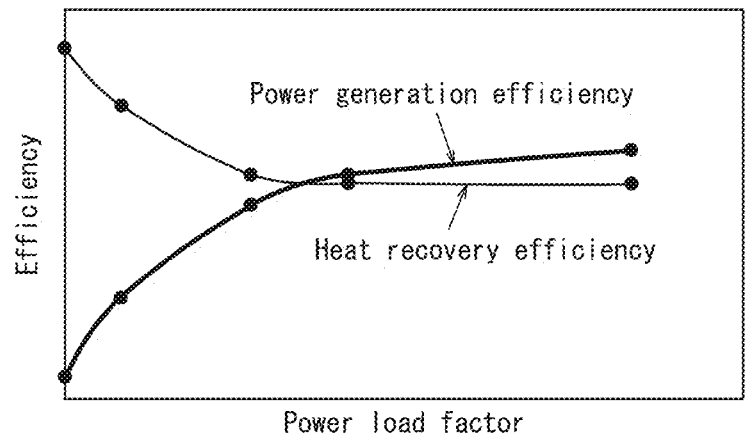
FIG. 3C is a diagram illustrating a relationship between the power load factor and the power generation efficiency or the heat recovery efficiency.

FIG. 3A is a diagram illustrating a relationship between the power load factor and the gas consumption. As illustrated in FIG. 3A, the relationship between the power load factor and the gas consumption is nonlinear. FIG. 3B is a diagram illustrating a relationship between the power load factor and the power generation amount or the heat recovery amount. FIG. 3C is a diagram illustrating a relationship between the power load factor and the power generation efficiency or the heat recovery efficiency. As illustrated in FIG. 3C, the power generation efficiency and the heat recovery efficiency are nonlinear. The power generation efficiency monotonously increases as the power load factor increases. On the other hands, the heat recovery efficiency monotonously decreases as the power load factor increases. Therefore, the power load factor when the power generation efficiency is the maximum is different from that when the heat recovery efficiency is the maximum.

Figure 4A:
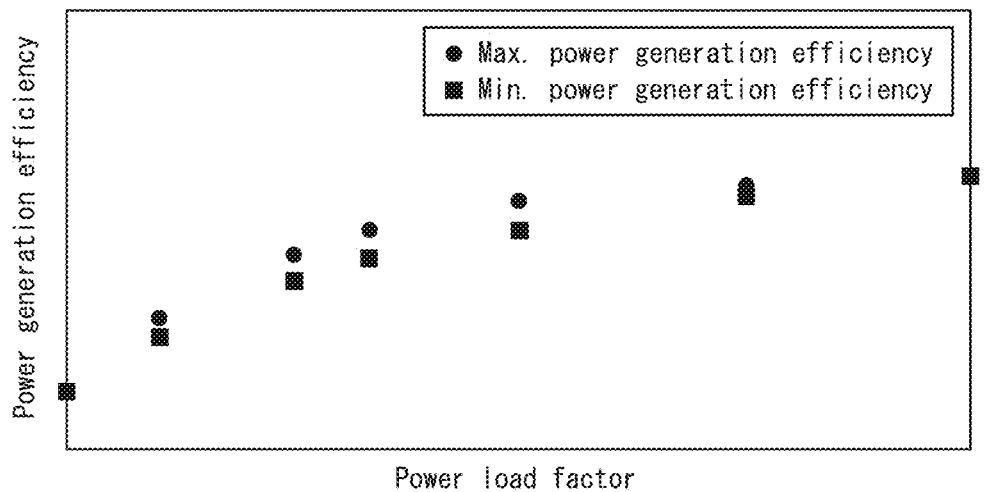
FIG. 4A is a diagram illustrating a relationship between the power load factor and the power generation efficiency.
Figure 4B:
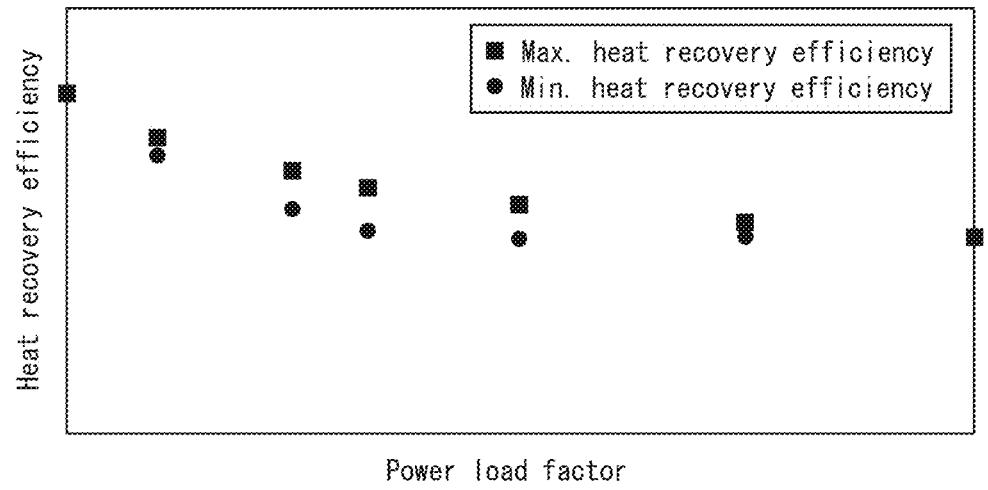
FIG. 4B is a diagram illustrating a relationship between the power load factor and the heat recovery efficiency.

FIGS. 4A, 4B and 5 are diagrams illustrating a relationship between the power load factor and each index when two or more fuel cell devices 1 are connected and operated. In FIGS. 4A and 4B, the horizontal axis, which is the power load factor, is a value indicating how much power of the maximum power generation amount (for example, when ten fuel cell devices 1 are used, it is 30 [kW]) is generated by the fuel cell devices 1. In this embodiment, as an example, [kW] is used as a unit of gas consumption, power generation amount and heat recovery amount (calorie). However, other units such as 1 watt [W]=1 joule [J]/sec. [S] may be used. Further, a unit on the basis of conversion formula of city gas calorific value of 45 megajoule [MJ]/cubic meter [m$^3$] may be used.

As illustrated in FIG. 4A, even if the overall power load factor of the fuel cell devices 1 is the same, there is a difference between the maximum power generation efficiency and the minimum power generation efficiency. With reference to FIG. 5, when the overall power load factor of the fuel cell devices 1 is 50%, for example, if outputs of respective fuel cell devices 1 are equal such as 1.5 [kW], the maximum power generation efficiency is obtained. Further, if output of any of the fuel cell devices 1 is zero, the minimum power generation efficiency is obtained. Same applies to the other cases except for the cases where the power load factor is 0% or 100%.

As illustrated in FIG. 4B, the heat recovery efficiency has also the similar tendency as the power generation efficiency. For example, as illustrated in FIG. 5, when the overall power load factor of the fuel cell devices 1 is 50%, if outputs of respective fuel cell devices 1 are the same such as 1.5 [kW], the minimum heat recovery efficiency is obtained. Further, if output of any of the fuel cell devices 1 is zero, the maximum power generation efficiency is obtained. Same applies to the other cases except for the cases where the power load factor is 0% or 100%.

Therefore, as illustrated in FIGS. 4 and 5, when each of the fuel cell devices 1 has the same power load factor (or the power generation amount), the maximum power generation efficiency is obtained. Further, when the power load factor of any of the fuel cell devices 1 is zero, the maximum heat recovery efficiency is obtained, This is because, even if the overall power load factor of the fuel cell devices 1 is the same, when the power load factor of each of the fuel cell devices 1 varies, the power generation efficiency and the heat recovery efficiency vary.

The controller 21 of the control device 2 can maximize the power generation efficiency or the maximum heat recovery efficiency of the fuel cell devices 1 by adjusting the power load factor of each of the fuel cell devices 1 and operating them. In this embodiment, the operation mode when the power generation efficiency is higher than a predetermined value (e.g. the maximum) is defined as a power generation efficiency priority mode, and the operation mode when the heat recovery efficiency is higher than the other predetermined value (for example, the maximum) is defined as a heat recovery priority mode. For example, when the controller 21 determines that the obtained heat demand value is smaller than the first predetermined value (determines that the heat demand is small), it determines the power generation efficiency priority mode as the operation mode of the fuel cell device 1. Further, when the controller 21 determines that the obtained heat demand value is equal to or greater than the second predetermined value that is greater than the first predetermined value (determines that the heat demand is large), it determines the heat recovery priority mode as the operation mode of the fuel cell device 1. For example, when ten fuel cell devices 1 are operated, the first predetermined value is 15 [kW]. The second predetermined value is 20 [kW]. However, each of the predetermined values is not limited thereto.

According to this embodiment, the controller 21 can control the fuel cell devices 1 not only on the basis of power demand but also on the basis of heat demand. Therefore, even if the usage pattern of power and heat is different from customer to customer, the most suitable control according to the customer needs that are different depending on the time of day can be provided. For example, when the controller 21 determines that the heat demand value is smaller than the first predetermined value during the hours in the middle of the night (from 9 pm to 3 am of the following day), it determines the power generation efficiency priority mode as the operation mode of the fuel cell device 1. On the other hands, when the controller 21 determines that the heat demand value is greater than the second predetermined value, which is larger than the first predetermined value, in the lunchtime hours (from noon to 2 pm) or the like, it determines the heat recovery priority mode as the operation mode of the fuel cell device 1.

[Life Unification Mode]

The life unification mode is a mode for determining which fuel cell device is to be operated for how long so that the difference in life among fuel cell devices 1 will be minimized. For simplicity of explanation, an example in which the controller 21 operates three fuel cell devices 1 of the first fuel cell device 1-1, the second fuel cell device 1-2 and the third fuel cell device 1-3 is illustrated. Instead of the heat recovery priority mode or the power generation efficiency priority mode, the controller 21 may determine the life unification mode as the operation mode. The controller 21 may also determine the heat recovery priority mode or the power generation efficiency priority mode as the operation mode, and at the same time may determine the life unification mode as the operation mode to determine which of the fuel cell devices 1 to be operated for how long.

FIG. 6A illustrates a power demand pattern at each time from 8 am to 7 pm in a consumer facility. The controller 21 acquires a power demand value that represents a power demand pattern from the memory 22. In this embodiment, as an example, the day when the fuel cell device 1 is started operation is defined as June 7, and hours are divided into one hour. FIG. 6B illustrates the operation results of June 7. For the purpose of explanation, in FIGS. 6B and 6C, instead of the power load factor, the power generation amount (=for example, 3 [kW]×power load factor) is used as an index.

In this embodiment, the controller 21 may calculate the life parameter L on the basis of a value acquired from multiplying the power generation amount by the power generation hour as illustrated in the following formula, for example.

(Life parameter $L$)=(Power generation amount)× (Power generation hour)

In the above example, the power generation amount and the power generation hour are used for calculating the life parameter. However, the life parameter may be calculated on the basis of the information related to the degradation degree of cell stacks or members constituting the SOFC, such as cumulative start-stop operation times.

With reference to FIG. 6B, the value of the life parameter of the first fuel cell device 1-1 is 1+2+3+3+3+3+3+3+3+3+2=29. In the same manner, the life parameters of the second fuel cell device 1-2 and the third fuel cell device 1-3 are 23 and 20, respectively. The controller 21 stores the calculated life parameter values in the memory 22. As an alternative example, the controller 21 may store the values of the life parameter in an external storage medium.

The controller 21 creates an operation schedule of the following day, which is June 8, on the basis of the operation results of June 7. For example, the time at which the controller 21 creates an operation schedule is 11 pm of June 7, it is not limited to that time. The power demand pattern of June 8 is as illustrated in FIG. 6A. The controller 21 acquires the power demand value indicating the power demand pattern of the following day from the memory 22. As an alternative example, the controller 21 may cooperate with an external system such as the building energy management system (BEMS), the community energy management system (CEMS) or the like. At this time, the controller 21 may acquire the power demand value that represents the power demand pattern. The controller 21 may also estimate the demand pattern of the following day on the basis of the tendency in the past.

The controller 21 determines the power generation amount of each of fuel cell devices 1 such that the power demand pattern for each time is satisfied.

Supposing that the controller 21 creates the operation schedule candidates as illustrated in FIG. 6C, the controller 21 calculates the life parameter values of each of the fuel cell devices 1 of June 8. The life parameters of the first fuel cell device 1-1, the second fuel cell device 1-2 and the third fuel cell device 1-3 of June 8 are 20, 26 and 26, respectively. The controller 21 stores the calculated life parameter values in the memory 22.

The controller 21 acquires the cumulative total value of the life parameter until the current day (June 8) from the memory 22 or an external storage medium. In this embodiment, the cumulative total value of the life parameter until the current day is equal to the life parameter value of the current day. Thus the cumulative total values of the life parameter until the current day are 29, 23 and 20 for the first fuel cell device 1-1, the second fuel cell device 1-2 and the third fuel cell device 1-3, respectively.

The controller 21 adds the cumulative total value of the life parameter until the current day and the life parameter value of the following day. The resulting added values are 49, 49 and 46 for the first fuel cell device 1-1, the second fuel cell device 1-2 and the third fuel cell device 1-3, respectively. The controller 21 stores the resulting added values in the memory 22.

The controller 21 determines whether the routine termination conditions are met or not. The routine termination conditions mean that all patterns possible as the operation schedule candidates of the following day are encompassed. When the controller 21 determines that all possible patterns are encompassed, it compares all possible patterns each other and determines the operation schedule candidate that minimizes the difference in total life parameter values as an operation schedule of the following day, and thus creates an operation schedule. The controller 21 stores the created operation schedule in the memory 22.

As an alternative method of determining an operation schedule that minimizes the difference in total of life parameter value, the controller 21 may use a genetic algorithm for retrieving multiple solutions in parallel or a simulated annealing for local search of one solution. An alternative example of the routine termination conditions may be the difference in the life parameter values which becomes a local solution.

When creating an operation schedule, the controller 21 may create an operation schedule that allows operation of any of the fuel cell devices 1 to be stopped in the light of efficiency and energy saving. When operation of any fuel cell device 1 is stopped, after that a start-up operation is needed. Times required for operation stop and operation start-up are determined as three hours, respectively, for example.

An example in which the controller 21 creates an operation schedule of from 6 pm of June 8 to 9 am of June 9 at 11 pm of June 7 is described. The power demand for that time period is as illustrated in FIG. 7A.

The controller 21 determines whether or not there is any fuel cell devices 1 to be stopped operating. Whether the operation is stopped or not is determined by the controller 21 on the basis of whether or not the heat demand value or the power demand value in the consumer facility is smaller than the predetermined value, whether or not the maintenance of the fuel cell device 1 is performed, or whether or not the gas supply to the fuel cell device 1 is disconnected.

When the controller 21 determines that there is a fuel cell device 1 to be stopped operating, it determines, with respect to the fuel cell device 1 to be stopped operating, the time at which operation is stopped and the time at which operation is started. As described with reference to FIG. 6C, the controller 21 determines the pattern that minimizes the difference in life parameter values among respective fuel cell devices 1 as an operation schedule. When the controller 21 creates the operation schedule candidates as illustrated in FIG. 7B, for example, it determines the candidate that minimizes the difference in life parameter values at the time of midnight as an operation schedule. The cumulative total values of the life parameter L at 7 pm of June 8 are 49, 49 and 46 for the first fuel cell device 1-1, the second fuel cell device 1-2 and the third fuel cell device 1-3, respectively. Thus, the cumulative total values of the life parameter L at the time of midnight are 56 (=49+2+2+1+1+1), 56 (=49+2+2+1+1+1) and 53 (=46+2+2+1+1+1) for the first fuel cell device 1-1, the second fuel cell device 1-2 and the third fuel cell device 1-3, respectively.

The controller 21 adds a predetermined value to the life parameter value of the second fuel cell device 1-2 to be stopped operating. As an example, the predetermined value is 20. This is because the temperature of the cell stack of the second fuel cell device 1-2 decreases when operation is stopped, which may cause degradation.

According to this embodiment, the controller 21 creates an operation schedule of the fuel cell device 1 so that the difference in the life parameter values among respective fuel cell devices 1 is minimized. Thus maintenance of each of the fuel cell devices 1 can be performed at the same timing, and as a result the rise in the management cost can be suppressed.

[Demand Response Mode]

In the demand response mode, the power is smoothed in response to the estimated demand value by an aggregator and the primary energy such as the power and the gas in the consumer facility is optimized. The controller 21 may determine, instead of the heat recovery priority mode or the power generation efficiency priority mode described above, the demand response mode as the operation mode. Further, the controller 21 may determine the heat recovery priority mode or the power generation efficiency priority mode as the operation mode, and at the same time determine the demand response mode as the operation mode to determine which of the fuel cell devices 1 is operated for how long.

As the first background, when the controller 21 controls the fuel cell devices 1 to supply power and heat to the power load 3 and the heat load 4, the power generation efficiency and the heat recovery efficiency of overall fuel cell devices 1 vary depending on the combination of the difference in cumulative operation hours among respective fuel cell devices 1 and the number of operating fuel cell devices 1.

As the second background, when the power aggregator cannot achieve the adjustment value applied to the power company or the like, a penalty is imposed on the aggregator. Thus, it is required for the aggregator to improve estimation accuracy so that the power demand pattern or the power generation supply prediction pattern identified by the aggregator itself is matched to the power supply and demand of the consumer facility or of the power generation facility. In this embodiment, the power management server provided in the aggregator may be connected to the control device 2 over the network NW.

Relating to the above described first and second backgrounds, when a plurality of fuel cell devices 1 are provided so as to match the power supply of the consumer facility to the estimated value of the aggregator, the power generation efficiency and the heat recovery efficiency may not be optimized by some control methods of the fuel cell device 1 for the following reasons.

Figure 8A:
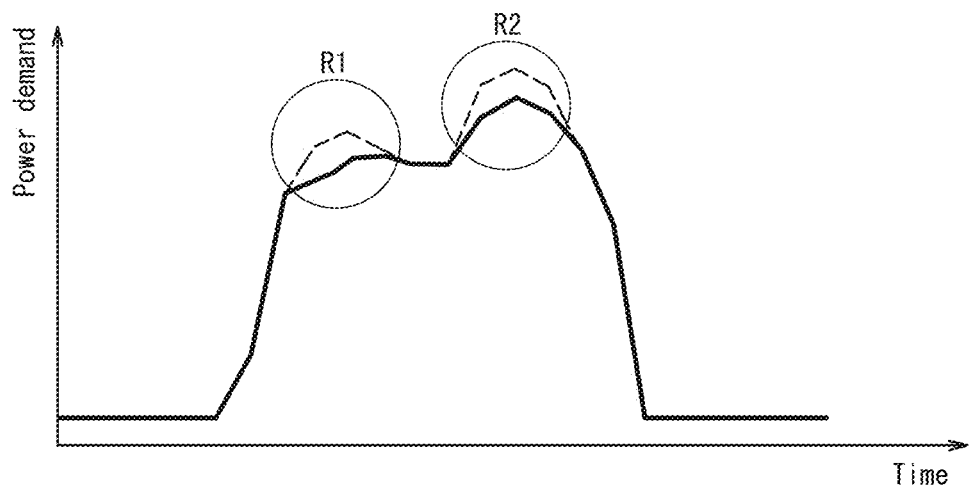
FIG. 8A is a diagram illustrating a relationship between time and power demand.
Figure 8B:
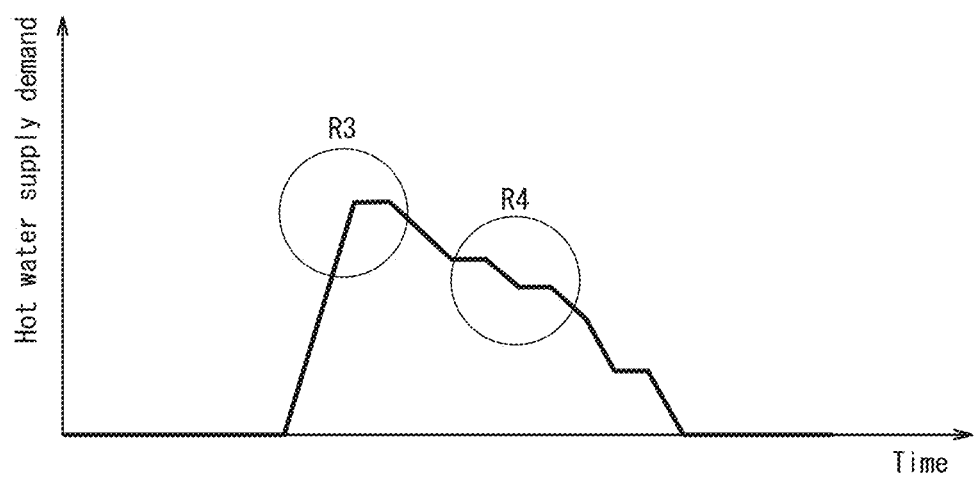
FIG. 8B is a diagram illustrating a relationship between time and hot-water supply demand.

For example, as illustrated in FIG. 8A, the power demand in the consumer facility can be reduced by the power generated by the fuel cell device 1. The solid line in FIG. 8A illustrates the power demand when power is supplied from the fuel cell device 1. The dashed line in FIG. 8A illustrates the power demand when power is not supplied from the fuel cell device 1. Suppose that the regions R1 and R2 have the same reduction value, the power demand can be reduced by using the fuel cell device 1 in this manner. However, on the other hand, even if the hot-water supply demand in region R4 of FIG. 8B can be covered by the heat supplied from the fuel cell device 1, there may be the case where the hot-water supply demand in the region R3 cannot be covered by the heat supplied from the fuel cell device 1.

Thus, the process of the disclosed demand response mode will be described in detail below.

For example, when the controller 21 receives a request for energy saving from the aggregator or the like, it acquires, as the power demand value and the heat demand value, the reduction target power value and the heat recovery target value from the memory 22. The reduction target power value and the heat recovery target value may be values input to the control device 2 by the user. Further, the heat recovery target value may be a value calculated on the basis of the hot-water supply temperature, hot-water consumption or the heat storage capacity of the hot water tank included in the heat load 4. The data related to power, gas, hot-water supply temperature or the like is stored in the memory 22.

The controller 21 determines the demand response mode as the operation mode of the fuel cell device 1. In this embodiment, as an example, ten fuel cell devices 1 each having the maximum power generation amount of 3 [kW] are provided, and the heat recovery target value and the reduction target power value are 16.6 [kW] and 15 [kW], respectively. In this embodiment, the unit of the heat recovery target value is [kW], or alternatively it may be [MJ].

The controller 21 creates a list of combination of the power load factor and the number of fuel cell devices 1 to be operated that satisfies the reduction target power value and stores the list in the memory 22. The combination list is illustrated in FIG. 9. The controller 21 extracts, as a candidate, the combination by which the total heat recovery amount matches the heat recovery target value from the combination list and stores the combination in the memory 22.

The controller 21 acquires the cumulative power generation amount [kWh] with respect to each fuel cell device 1 from the memory 22 and assigns power load factor for setting. In FIG. 9, as for the candidate A, the numbers of the fuel cell devices 1 to which the power load factors of 0%, 25%, 50%, 75% and 100% are assigned are 1, 3, 2, 3 and 1, respectively. On the other hands, as for the candidate B, the numbers of fuel cell devices 1 to which the power load factors of 0%, 25%, 50%, 75% and 100% are assigned are 2, 3, 0, 3 and 2, respectively. For simplicity of explanation, with respect to the candidate B, the case where the controller 21 assigns power load factors to fuel cell devices 1, respectively, will be described with reference to FIG. 10.

For setting, the controller 21 assigns higher priorities in decreasing order of cumulative power generation amount, and lower cumulative power generation amounts in decreasing order of priority. Therefore, the power load factor of 0% is assigned to the first fuel cell device 1-1 and the second fuel cell device 1-2, and the power load factor of 25% is assigned to the third fuel cell device 1-3, the fourth fuel cell device 1-4 and the fifth fuel cell device 1-5. The controller 21 assigns the power load factor to the other fuel cell devices 1 in the same manner. The fuel cell device 1 to which 25%, 50%, 75% or 100% is assigned as the power load factor may immediately become an object to be controlled and may be operated. For simplicity of explanation, the detailed explanation of the case where the controller 21 assigns, with respect to the candidate A, the power load factors to each of the fuel cell devices 1 will be omitted.

As an alternative example, in the combination list, the case where the combinations by which the total heat recovery amount matches the heat recovery target value are patterns A and B will be described. Here, three fuel cell devices 1 are operated. As illustrated in FIG. 11, in pattern A, the controller 21 assigns the power load factor of 0% to one fuel cell device 1, and assigns the power load factors of 25%, 50% and 100% to zero, one and one fuel cell device 1, respectively. In pattern B, the controller 21 assigns the power load factor of 0% to zero fuel cell device 1, and assigns the power load factors of 25%, 50% and 100% to two, zero and one fuel cell device(s) 1, respectively.

The controller 21 determines which power load factor to assign to which fuel cell device 1. Although the controller 21 makes the above determination with respect to both of patterns A and B illustrated in FIG. 11, for simplicity of explanation, the case where the controller 21 makes the determination with respect to pattern A will be described.

FIGS. 12A and 12B illustrate a part of various combinations of the fuel cell device 1 and the power load factor in pattern A. For simplicity of explanation, explanation of other combinations will be omitted. In greater detail, in FIG. 12A, the controller 21 assigns the power load factors of 100%, 50% and 0% to the first fuel cell device 1-1, the second fuel cell device 1-2 and the third fuel cell device 1-3, respectively. In FIG. 12B, the controller 21 assigns the power load factors of 0%, 50% and 100% to the first fuel cell device 1-1, the second fuel cell device 1-2 and the third fuel cell device 1-3, respectively.

In an alternative example, the cumulative power generation amounts of the first fuel cell device 1-1, the second fuel cell device 1-2 and the third fuel cell device 1-3 are 1,000 kWh, 1,500 kWh and 2,000 kWh, respectively. Thus, as illustrated in FIGS. 12A and 12B, the controller 21 assigns smaller weighting coefficients in ascending order of cumulative power generation amount. The weighting coefficients of the first fuel cell device 1-1, the second fuel cell device 1-2 and the third fuel cell device 1-3 are 1, 1.5 and 2, respectively, for example.

With respect to each of the fuel cell devices 1, the controller 21 multiplies the weighting coefficient by the power load value. Therefore, in FIG. 12A, the multiplied values of the first fuel cell device 1-1, the second fuel cell device 1-2 and the third fuel cell device 1-3 are 3, 2.25 and 0, respectively. The controller 21 calculates the total of the multiplied values. In the case of FIG. 12A, the total is 5.25. On the other hand, in FIG. 12B, the multiplied values of the first fuel cell device 1-1, the second fuel cell device 1-2 and the third fuel cell device 1-3 are 0, 2.25 and 6, respectively. The controller 21 calculates the total of the multiplied values. In FIG. 12B, the total is 8.25.

The controller 21 selects, among all possible combinations, a combination resulting in the smallest total of multiplied values. The controller 21 selects a combination resulting in the smallest total of multiplied values with respect to pattern A and a combination resulting in the smallest total of multiplied values with respect to pattern B.

The controller 21 compares the combination resulting in the smallest total of multiplied values of Pattern A with the combination resulting in the smallest total of multiplied values of pattern B. By the comparison, the controller 21 selects a combination resulting in smaller total of multiplied values, creates an operation schedule on the basis of the selected combination, and operates the fuel cell device 1.

According to this embodiment, both the power generation target value and the heat recovery target value corresponding to the demand response can be satisfied, and the heat recovery in proper quantities can be achieved when the power supply and demand are adjusted. When a hot water tank is provided in a consumer facility or the like, according to the heat storage capacity of the hot water tank, the controller 21 can supply power such that the reduction target power value is satisfied. Further, the controller 21 determines the power generation amounts of respective fuel cell devices 1 such that the difference in cumulative power generation amount between each fuel cell device 1 is reduced. Thus, generation of a difference in the power generation efficiency or the heat recovery efficiency between each fuel cell device 1 caused by the difference in cumulative power generation amount can be reduced, and therefore generation of economic loss is reduced and economic burden can be relieved. Further, the controller 21 controls the fuel cell devices 1 such that the difference in cumulative power generation between each fuel cell device 1 is reduced. Thus the component of each fuel cell device 1 can be replaced at the same timing, and therefore the maintenance management efficiency can be improved.

[Emergency Mode]

The emergency mode can be selected when power supply from the grid 5 is disconnected or the like. Instead of the heat recovery priority mode or the power generation efficiency priority mode, the controller 21 may determine the emergency mode as the operation mode. The controller 21 may also determine the heat recovery priority mode or the power generation efficiency priority mode as the operation mode, and at the same time determine the emergency mode as the operation mode in order to determine to which load (the power load 3 or the heat load 4) to supply the power and heat.

As the first background of the emergency mode, when a plurality of fuel cell devices 1 are operated to supply power or heat to the load, the power generation efficiency and the heat recovery efficiency of the fuel cell devices 1 vary depending on the combination of the difference in cumulative operation hours between each fuel cell device 1 and the number of fuel cell devices 1 to be operated.

As the second background, an emergency in which power supplied from the grid 5 is disconnected due to power outage may occur. In this case, the fuel cell devices 1 may preferentially supply heat or power to high-priority critical devices such as emergency lights, feed pumps, elevators, cold/hot water devices for food administration or the like, and if possible, may supply power to the other general devices.

In consideration of the first background and the second background, in case of emergency, when the fuel cell devices 1 are controlled only on the basis of the power load value of the load whose priority is set high by the user, excessive or lack of heat recovery amount may occur, and power or heat may not be optimally supplied in the consumer facility.

In order to handle the above situation, the process of the emergency mode may be described in detail below.

At any point in time, the controller 21 acquires the power generation target value and the heat recovery target value from the memory 22 as the power demand value and the heat demand value. When an emergency hot water tank is provided in the consumer facility, the controller 21 may calculate the heat recovery target value on the basis of the heat storage capacity of the hot water tank. In this embodiment, as an example, suppose that the power generation target value and the heat recovery target value of the load whose priority is set high (hereinafter referred to as a critical device) is 15 [kW] and 16.6 [kW], respectively. The controller 21 sets the power generation target value and the heat recovery target value as the power generation target value and the heat recovery target value of the fuel cell device 1 and stores them in the memory 22

In this embodiment, as an example, ten fuel cell devices 1 are provided, and the maximum power generation target value of the ten fuel cell devices 1 is 25 [kW]. The maximum heat recovery target value is 25 [kW]. Further, in this embodiment, as an example, the maximum power generation amounts of respective fuel cell devices 1 are supposed to be 3 [kW].

The controller 21 extracts a combination of fuel cell devices 1 that satisfies 15 [kW], which is the power generation target value of the critical device. For simplicity of explanation, the case where the combination illustrated in FIG. 9 is extracted is described. The controller 21 determines, out of the extracted combinations, the combination by which the total heat recovery amount matches the heat recovery target value, 16.6 [kW], of the critical device as a candidate. In this embodiment, the case where candidates A and B illustrated in FIG. 9 are determined as candidates is described.

The controller 21 acquires the priority information of the general devices from the memory 22. The priority of the general device may be set by the user or set by the controller 21 on the basis of predetermined criteria.

With reference to the priority information, the controller 21 acquires the power consumption value and the heat consumption value of the device whose priority is set the highest out of the general devices. The controller 21 adds the power consumption value, 10 [kW], and the power generation target value of the critical device, 15 [kW], then 25 [kW] is obtained. Thus, as illustrated in FIG. 13, the difference from the maximum power generation target value is 0 [kW].

The controller 21 also acquires the heat consumption value of the device whose priority is set the highest of the general devices. The controller 21 adds the heat consumption value, 5.6 [kW], and the heat recovery target value of the critical device, 16.6 [kW], and 22.2 [kW] is obtained. Thus, as illustrated in FIG. 13, the difference from the maximum heat recovery target value is 2.8 [kW].

The controller 21 according to this embodiment performs the similar process with respect to all of the general devices, and in decreasing order of priority, determines whether or not both of the difference from the maximum power generation target value and the difference from the maximum heat recovery target value illustrated in FIG. 13 are within the predetermined threshold values, respectively. The controller 21 adds the general device having both of a difference from the maximum power generation target value and a difference from the maximum heat recovery target value within the predetermined thresholds as a device to which power and heat are supplied. In this embodiment, explanation is given on the assumption that the controller 21 adds an air conditioner and a water cooler/heater for air conditioner having priority 1 as a device to which power and heat are supplied.

The controller 21 updates the power generation target value and the heat recovery target value on the condition that the power and the heat are supplied, in addition to the critical device, also to the general device added as a device to which the power and the heat are supplied. In other words, the controller 21 updates the power generation target value from 15 [kW] to 25 [kW] and the heat recovery target value from 16.6 [kW] to 22.2 [kW] in the memory 22, The controller 21 determines the power load factors of respective fuel cell devices 1 on the basis of the updated power generation target value and the updated heat recovery target value. In greater detail, the controller 21 extracts the combination by which the power generation target value of 25 [kW] and the heat recovery target value of 22.2 [kW] are satisfied from the possible combinations. In this embodiment, as illustrated in FIG. 14, an explanation is given on the assumption that the controller 21 extracts candidates C and D.

The controller 21 acquires values of cumulative power generation amount of respective fuel cell devices 1 from the memory 22 and assigns higher priorities in decreasing order of the cumulative power generation amount. With respect to each of the candidates C and D, the controller 21 assigns lower power load factors in decreasing order of priority. For simplicity of explanation, the case where the controller 21 assigns power load factors to the candidate D will be described with reference to FIG. 15.

With respect to candidate D, the number of fuel cell devices 1 to which the power load factor of 0% is assigned is two. Therefore, the controller 21 assigns the power load factor of 0% to the first fuel cell device 1-1 and the second fuel cell device 1-2 of high priority. Further, with respect to candidate D, the number of fuel cell devices 1 to which the power load factor of 75% is assigned is two. Therefore, the controller 21 assigns the power load factor of 75% to the third fuel cell device 1-3 and the fourth fuel cell device 1-4 whose priority is third and fourth, respectively. The controller 21 assigns the power load factor of 100% to the other fuel cell devices 1.

The controller 21 assigns power load factors to respective fuel cell devices 1 to create an operation schedule and controls the fuel cell devices 1 on the basis of the operation schedule.

As an alternative example, after extracting candidates C and D, the controller 21 may determine that which power load factor is assigned to which fuel cell device 1 by using the weighting coefficient. The determination method using the weighting coefficient is as described with reference to FIGS. 11 and 12, and thus the detailed explanation thereof is omitted.

According to this embodiment, the power demand and the heat demand of the critical device can be secured, and further, optimization of the primary energy such as the power and heat in the consumer facility can be realized.

Thus generation of the economic loss can be reduced, and the economic burden can be also reduced. Further, since the controller 21 controls the fuel cell device 1 such that the difference in the cumulative power generation amount between each fuel cell device 1 will be small, the component of each fuel cell device 1 is replaced at the same timing, and the maintenance management efficiency can be improved.

Subsequently the environmental priority mode ($CO_2$ emission priority mode), the power selling mode, the economy mode and the balance mode (hereinafter referred to as four modes) will be described. Instead of the above described heat recovery priority mode or the power generation efficiency priority mode, the controller 21 may determine at least one of the four modes as the operation mode. Further, the controller 21 may determine the above described heat recovery priority mode or the power generation efficiency priority mode as the operation mode, and at the same time may also determine at least one of the four modes as the operation mode, for example, to determine which fuel cell device 1 is operated for how long.

[Environmental Priority Mode]

In the environmental priority mode, the amount of $CO_2$ emitted from the fuel cell device 1 can be decreased. The controller 21 acquires the value of $CO_2$ amount emitted from a plurality of fuel cell devices 1 and can control the fuel cell devices 1 so that the value is reduced (for example, to minimize).

[Power Selling Mode]

In the power selling mode, power generated by the fuel cell device 1 is sold. For example, the controller 21 may acquire the value of power selling or purchasing rate over the network NW or the like, and control the fuel cell devices 1 so that the amount obtained from selling and purchasing is increased (for example, to maximize).

[Economy Mode]

In the economy mode, reduction in the economic loss and reduction in the economic burden can be realized. The economy mode includes the emergency mode or the DR mode, for example, in this embodiment, but it is not limited thereto.

[Balance Mode]

In the balance mode, a balance between the power generation efficiency and the heat recovery efficiency can be adjusted, for example. Therefore, the balance mode may include the power generation efficiency priority mode and the heat recovery priority mode. The balance mode may also be a mode for balancing the life when only a part of the fuel cell contained in the fuel cell device 1 is deteriorated. Therefore, the balance mode may include the life unification mode.

Figure 16:
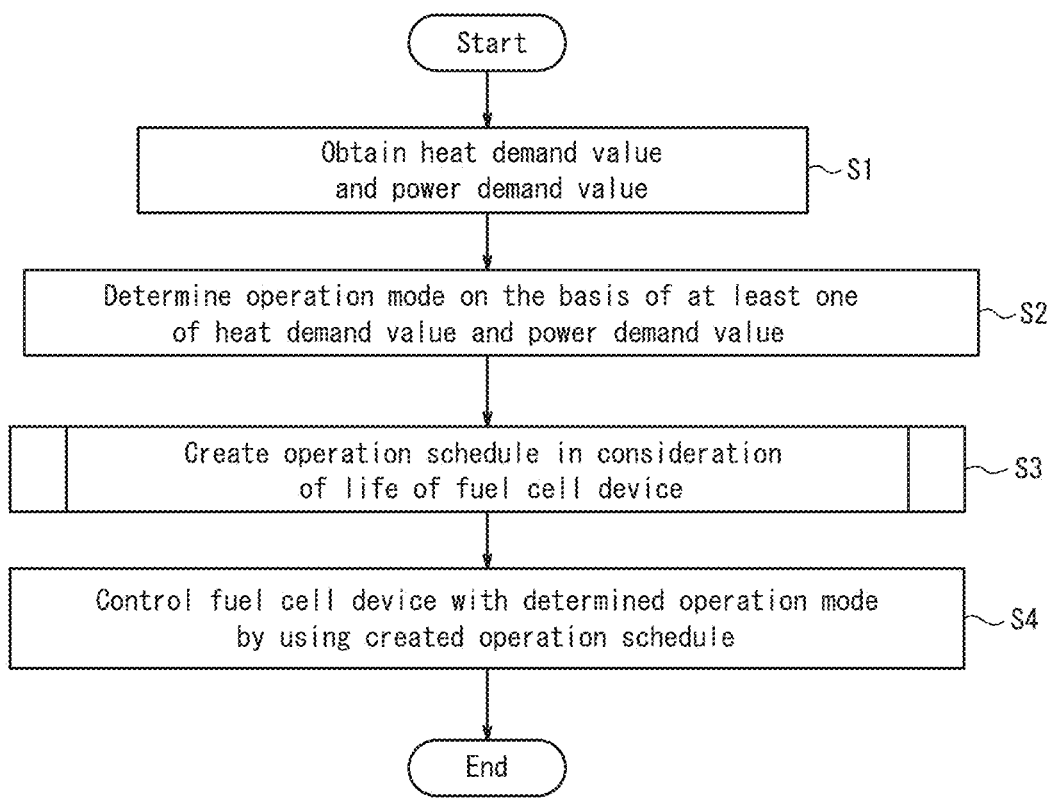
FIG. 16 is a flowchart illustrating an example of a process performed by a controller of the control device according to an embodiment of this disclosure.

The control method executed by the controller 21 of the control device 2 according to this embodiment will be described with reference to the flowchart illustrated in FIG. 16.

The controller 21 acquires a heat demand value and a power demand value from the memory 22, for example (step S1). The controller 21 determines the operation mode of the fuel cell device 1 on the basis of the acquired heat demand value and power demand value (step S2). For example, when the controller 21 determines that the heat demand value is smaller than the first predetermined value, it determines the power generation efficiency priority mode as the operation mode. The number of operation modes determined in step S2 is not limited to one, and a plurality of operation modes may be combined.

The controller 21 creates an operation schedule of the fuel cell device 1 depending on the life of the fuel cell device 1 (step S3). For example, the controller 21 creates an operation schedule of the fuel cell device 1 depending on the life using the life unification mode, the demand response mode, the emergency mode or the like. The subroutine of step S3 will be described later with reference to FIG. 17.

The controller 21 uses the created operation schedule and controls the fuel cell device 1 by the determined operation mode (step S4).

Figure 17:
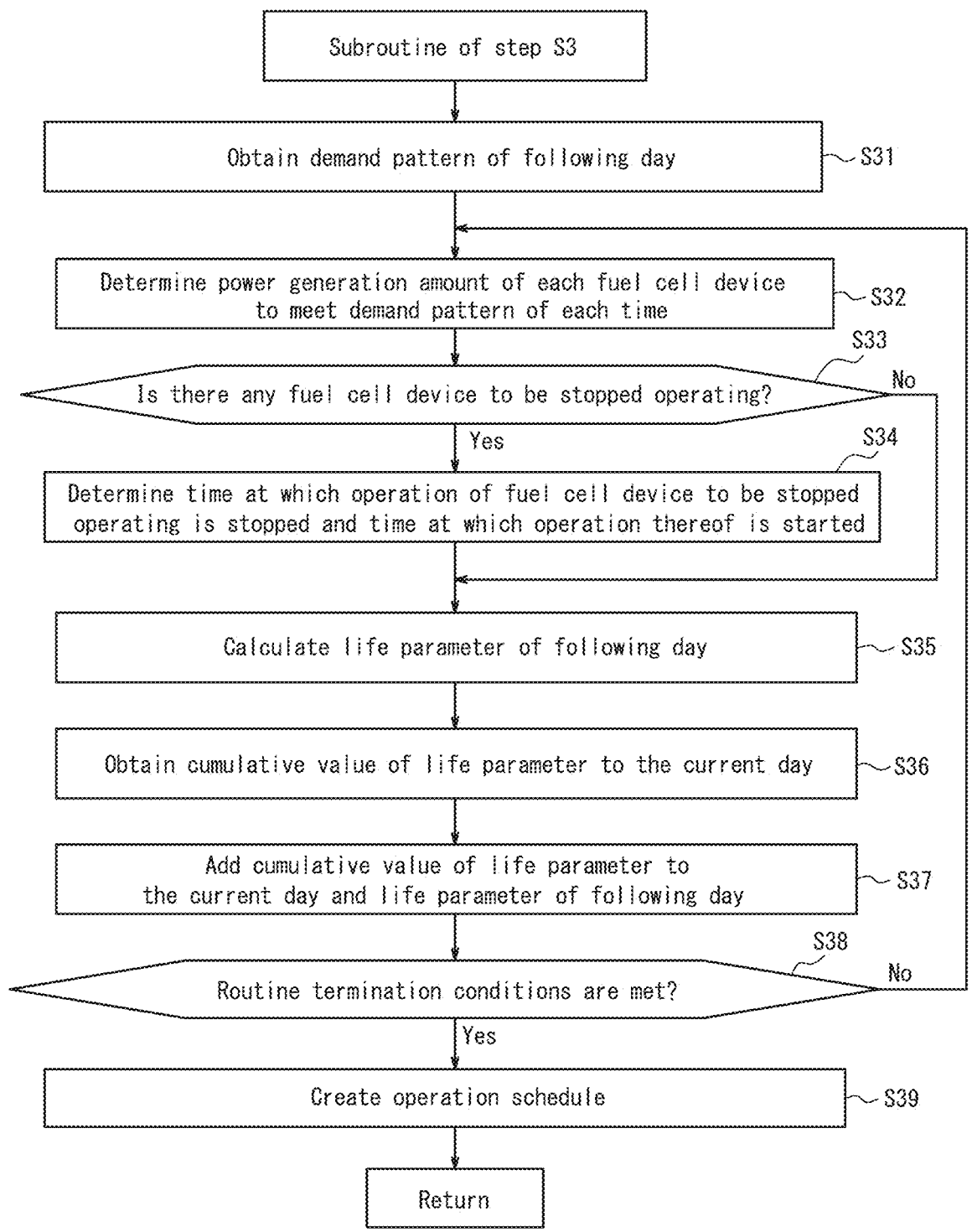
FIG. 17 is a diagram illustrating a sub-routine of FIG. 16.

FIG. 17 is a diagram illustrating a subroutine of step S3. In FIG. 17, as an example, the case where the controller 21 determines the life unification mode in step S2 is described.

The controller 21 acquires a demand pattern of the following day from the memory 22 at a predetermined time (e.g. at 11 pm) (step S31). The controller 21 determines the power generation amount of each fuel cell device 1 so that the demand pattern at each time is satisfied (step S32).

The controller 21 determines whether or not there is a fuel cell device 1 whose operation is to be stopped on the basis of the power demand value, the heat demand value or the like (step S33). If Yes in step S33, the controller 21 determines the time at which operation of the fuel cell device 1 is stopped and the time at which its operation is started (step S34). If No in step S33, the controller 21 does not execute step S34.

The controller 21 calculates the life parameter of the following day on the basis of the power generation amount of each of the fuel cell devices 1 (step S35). The controller 21 acquires the cumulative total value of the life parameter until the current day from the memory 22 (step S36).

The controller 21 adds the cumulative total value of the life parameter until the current day and the life parameter value of the following day (step S37). The controller 21 determines whether the routine termination conditions are met or not (step S38). The routine termination conditions are, for example, all possible patterns as the operation schedule candidates of the following day are encompassed.

The controller 21 creates an operation schedule by comparing all possible patterns and determining the operation schedule candidate that allows the difference in the life parameter value to be minimum as the operation schedule of the following day (step S39).

Although this disclosure has been described on the basis of the figures and the embodiment, it is to be understood that various changes and modifications may be implemented easily on the basis of this disclosure by those who are ordinarily skilled in the art. Accordingly, such changes and modifications are included in the scope of this disclosure. For example, functions and the like included in each member, each means, each step and the like may be rearranged without logical inconsistency. Further, when this disclosure is implemented as a disclosure of method, a plurality of members or steps may be combined together or divided.

Figure 18:
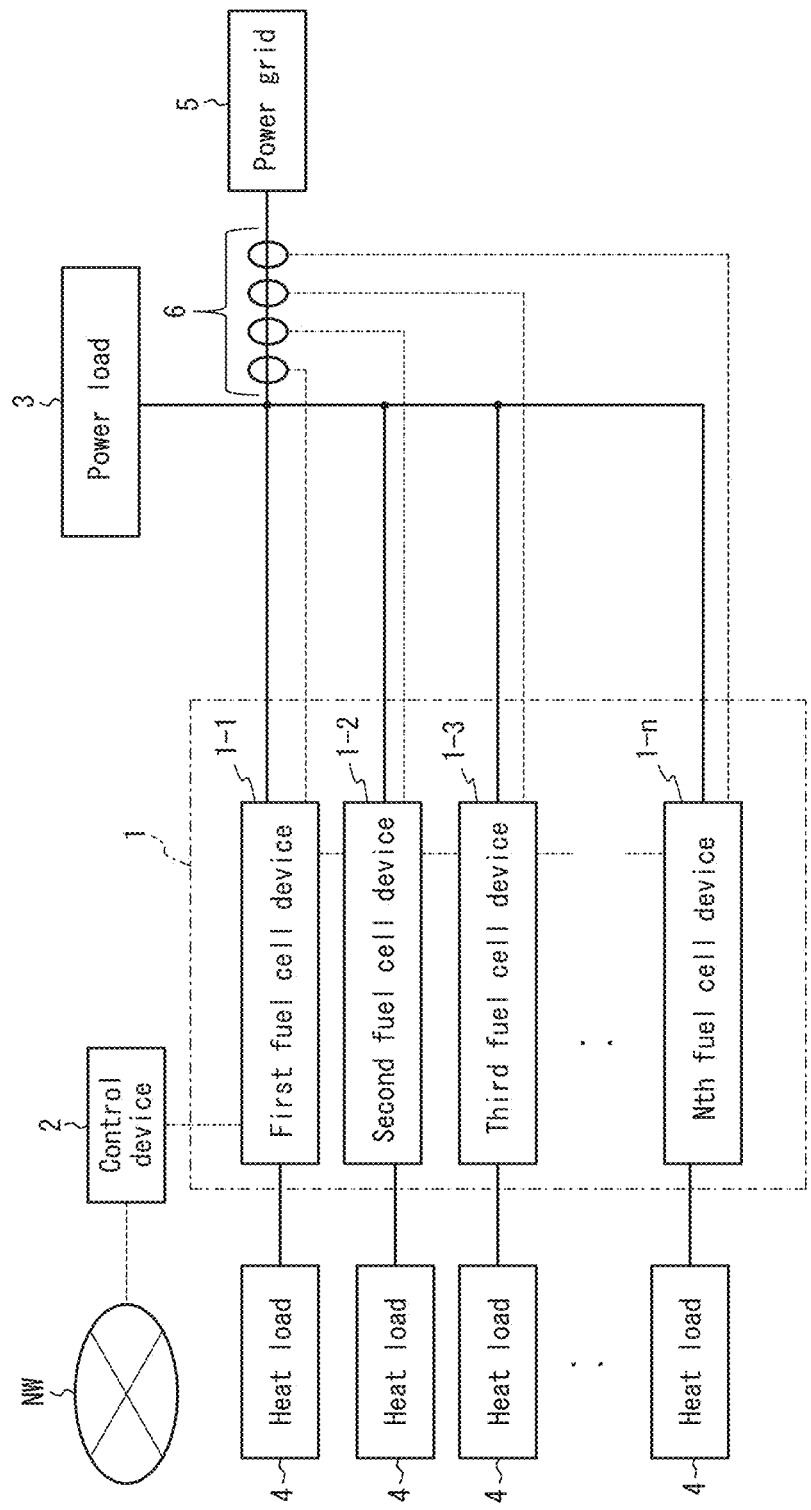
FIG. 18 is a functional block diagram of a cogeneration system according to another embodiment of this disclosure.

In the above embodiment, as illustrated in FIG. 1, heat emitted from each of the fuel cell devices 1 is collected in a heat exhaust line and supplied to the heat load 4. However, in another embodiment, as illustrated in FIG. 18, each of the fuel cell devices 1 may be connected to its corresponding heat load 4, and the controller 21 may control the fuel cell device 1 depending on the heat demand of each heat load 4.

According to another embodiment, each of the fuel cell devices 1 is connected to its corresponding heat load 4. The control device 2 controls the fuel cell devices 1 depending on heat demand of each heat load 4. Thus heat line can be minimized and heat loss can be reduced. Further, heat demand of the heat load 4 can be satisfied.

Many aspects of this disclosure may be represented by a series of operations executed by a computer system or other hardware those are capable of executing a program instruction. The computer system or the other hardware represented by a series of operations includes, for example, a general-purpose computer, a personal computer (PC), a special purpose computer, a workstation, a personal mobile communications system (PCS), an electronic notepad, a laptop computer, and other programmable data processing apparatuses. Note that in the embodiment of this disclosure the various operations are executed by a dedicated circuit implemented with a program instruction (software) (e.g., discrete logic gates interconnected to perform a specific function), or a logical block, a program module or the like executed by at least one processor. The at least one processor for executing the logical block, the program module and the like includes, for example, at least one microprocessor, Central Processing Unit (CPU), Application Specific Integrated Circuit (ASIC), Digital Signal Processor (DSP), Programmable Logic Device (PLD), Field Programmable Gate Array (FPGA), a controller, a microcontroller, an electronic apparatus, and other apparatuses designed to be capable of executing the functions described herein, and/or a combination thereof. The embodiment presented herein is implemented by, for example, hardware, software, firmware, middleware, a microcode, or any combination thereof.

Also, the machine-readable non-transitory storage medium used herein may be constituted by using a solid state memory or a tangible carrier (medium) readable by the computer such as a magnetic disk and an optical disk, and stores an appropriate set of computer instructions such as program modules and a data structure those for making the processor to execute the technique disclosed herein. The computer-readable medium includes an electric connection with at least one wiring, a magnetic disk storage media, and optical storage devices (e.g., Compact Disk (CD), Digital Versatile Disc (registered trademark) (DVD) and a Blu-ray disc), a portable computer disk, Random Access Memory (RAM), Read-Only Memory (ROM), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

The invention claimed is:

1. A cogeneration system, comprising:
a plurality of fuel cell devices supplying heat and power to a heat load and a power load; and
a control device connected to the fuel cell devices, the control device programmed
to calculate a heat demand value of the heat load,
to determine an operation mode of the fuel cell devices on the basis of at least one of the calculated heat demand value of the heat load and a power demand value of the power load, wherein the heat load receives the heat from the plurality of fuel cell devices and the power load receives the power from the plurality of fuel cell devices, and
to control a power generation efficiency and a heat recovery efficiency by controlling the fuel cell devices on the basis of the operation mode determined,
to calculate the heat demand value and the power demand value on the basis of at least one of weather, gas rate, power selling or purchasing rate, break-even point of a consumer facility, day of week, degradation degree of the fuel cell devices, time of day, or gas consumption,
wherein
in response to the calculated heat demand value being smaller than a first predetermined value, the control device is programmed to determine a power generation efficiency priority mode as the operation mode, wherein, under the power generation efficiency priority mode, the control device is programmed to control the fuel cell devices to maximize power generation efficiency by controlling power generation amounts of the fuel cell devices to be the same,
in response to the calculated heat demand value being equal to or greater than a second predetermined value that is greater than the first predetermined value, the control device is programmed to determine a heat recovery priority mode as the operation mode, wherein, under the heat recovery priority mode, the control device is programmed to control the fuel cell devices to maximize heat recovery efficiency by controlling a power generation amount of at least one of the plurality of fuel cell devices to become zero,
the power generation efficiency is a ratio of a total electrical power generation amount to a gas consumption amount of the fuel cell devices,
the heat recovery efficiency is a ratio of a total heat recovery amount to the gas consumption amount of the fuel cell devices, and
when a power load factor increases, the power generation efficiency increases while the heat recovery efficiency decreases, the power load factor indicating a maximum power generation amount of the fuel cell devices.

2. The cogeneration system according to claim 1, wherein the plurality of fuel cell devices is connected to a grid, and when power supply from the grid is disconnected, the control device is further programmed to control the plurality of fuel cell devices to supply heat or power preferentially to a load whose priority is set higher than other loads.

3. The cogeneration system according to claim 1, wherein the control device is further programmed to calculate the heat demand value and the power demand value on the basis of a heat recovery target value and a power generation target value, respectively.

4. The cogeneration system according to claim 3, wherein the control device is further programmed to determine the heat recovery target value on the basis of a heat storage capacity of a hot water tank contained in the heat load.

5. The cogeneration system according to claim 1, wherein the control device is further programmed to:
calculate a past cumulative total value of a life parameter on the basis of a value obtained by multiplying a power generation amount by a power generation hour with respect to each of the plurality of fuel cell devices or on the basis of a number of start-stop times with respect to each of the plurality of fuel cell devices,
create an operation schedule for each of the plurality of fuel cell devices so that a difference in total of life parameter value is minimized, and
operate each of the plurality of fuel cell devices on the basis of its respective operation schedule.

6. The cogeneration system according to claim 5, wherein, when the control device stops operation of one of the plurality of fuel cell devices on the basis of the operation schedule, the control device is further programmed to add a predetermined value to a life parameter of the one of the plurality of fuel cell devices whose operation is stopped.

7. The cogeneration system according to claim 1, wherein the control device is further programmed to:
set a priority with respect to each of the plurality of fuel cell devices in decreasing order of cumulative power generation amount,
determine an operation schedule of the plurality of fuel cell devices or an output of one of the plurality of fuel cell devices to be controlled immediately by assigning a power load factor corresponding to the priority, and
control the plurality of fuel cell devices on the basis of the operation schedule.

8. The cogeneration system according to claim 1, wherein each of the plurality of fuel cell devices is connected to a corresponding heat load, and the control device is further programmed to control the plurality of fuel cell devices depending on a heat demand with respect to each heat load.

9. A control method of a control device in a cogeneration system, the cogeneration system comprising a plurality of fuel cell devices supplying heat and power to a heat load and a power load, the control device connected to the fuel cell devices, the method comprising:
calculating, by the control device, a heat demand value of the heat load;
determining, by the control device, an operation mode of the fuel cell devices on the basis of at least one of the calculated heat demand value of the heat load and a power demand value of the power load, wherein the heat load receives the heat from the plurality of fuel cell devices and the power load receives the power from the plurality of fuel cell devices;
calculating the heat demand value and the power demand value on the basis of at least one of weather, gas rate, power selling or purchasing rate, break-even point of a consumer facility, day of week, degradation degree of the fuel cell devices, time of day, or gas consumption, controlling, by the control device, a power generation efficiency and a heat recovery efficiency by controlling the plurality of fuel cell devices on the basis of the operation mode determined, wherein said controlling comprises:
  in response to the calculated heat demand value being smaller than a first predetermined value, determining a power generation efficiency priority mode as the operation mode,
  under the power generation efficiency priority mode, controlling the fuel cell devices to maximize power generation efficiency by controlling power generation amounts of the fuel cell devices to be the same,
  in response to the calculated heat demand value being equal to or greater than a second predetermined value that is greater than the first predetermined value, determining a heat recovery priority mode as the operation mode, and
  under the heat recovery priority mode, controlling the fuel cell devices to maximize heat recovery efficiency by controlling a power generation amount of at least one of the plurality of fuel cell devices to become zero, wherein
the power generation efficiency is a ratio of a total electrical power generation amount to a gas consumption amount of the fuel cell devices,
the heat recovery efficiency is a ratio of a total heat recovery amount to the gas consumption amount of the fuel cell devices, and
when a power load factor increases, the power generation efficiency increases while the heat recovery efficiency decreases, the power load factor indicating a maximum power generation amount of the fuel cell devices.

* * * * *